Figure 10:
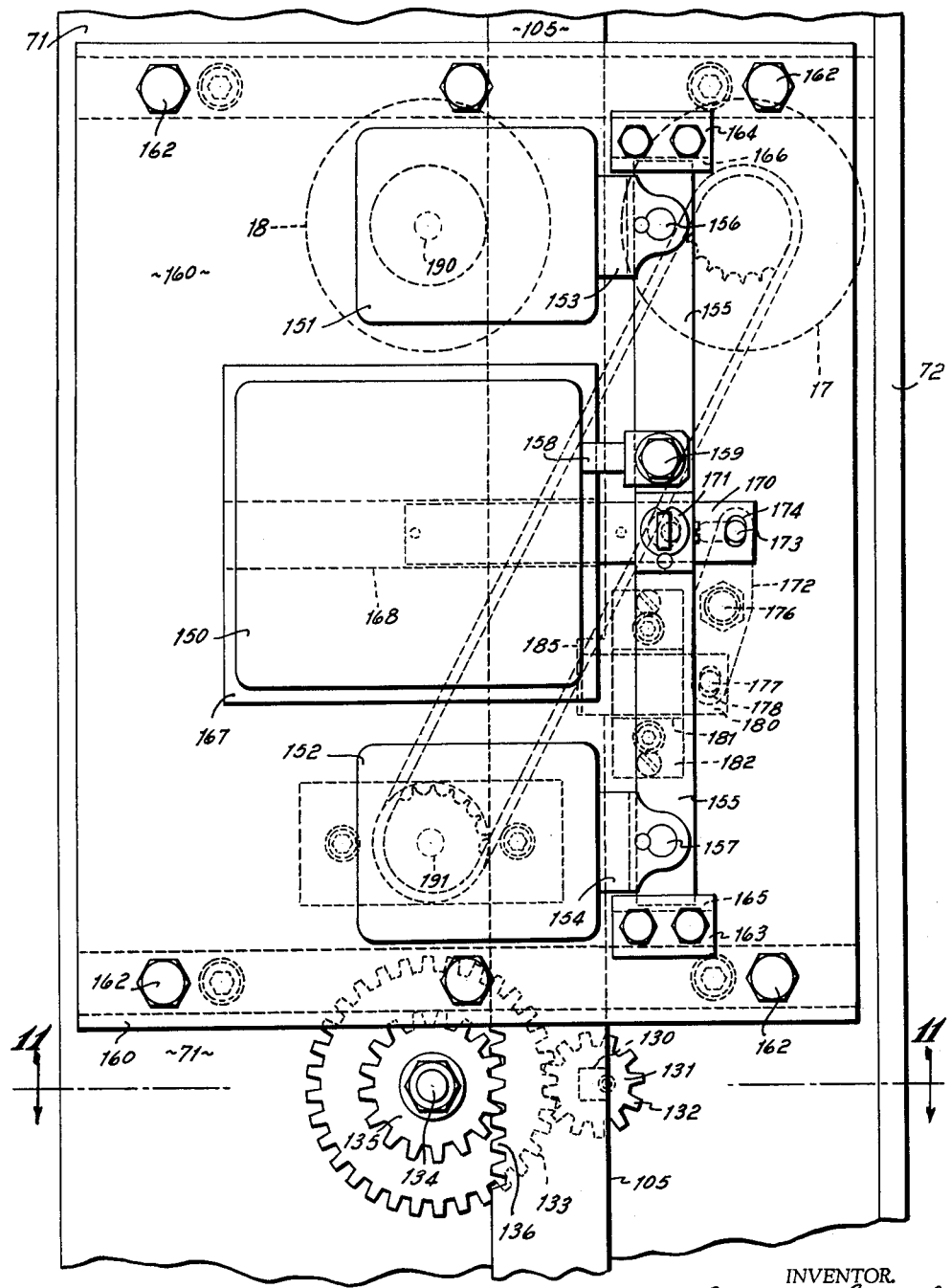

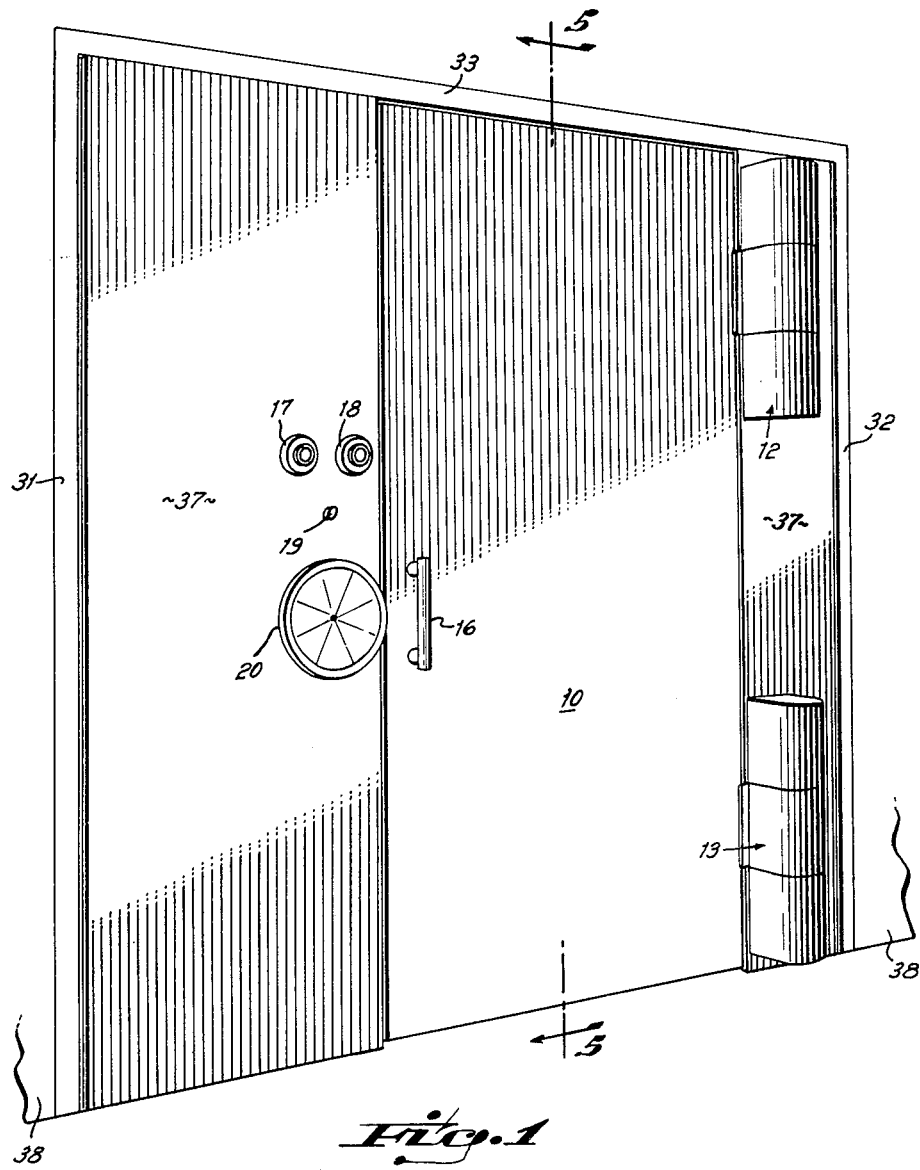

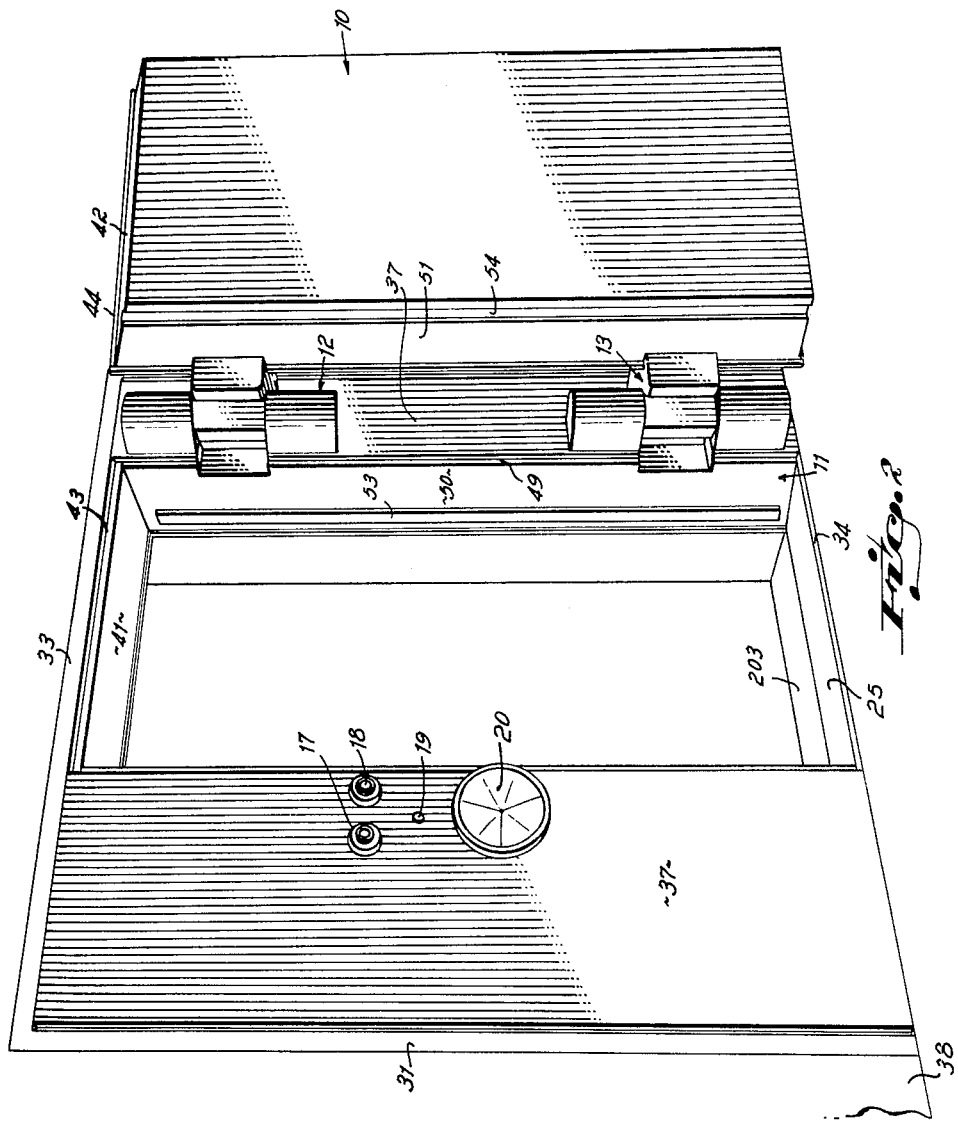

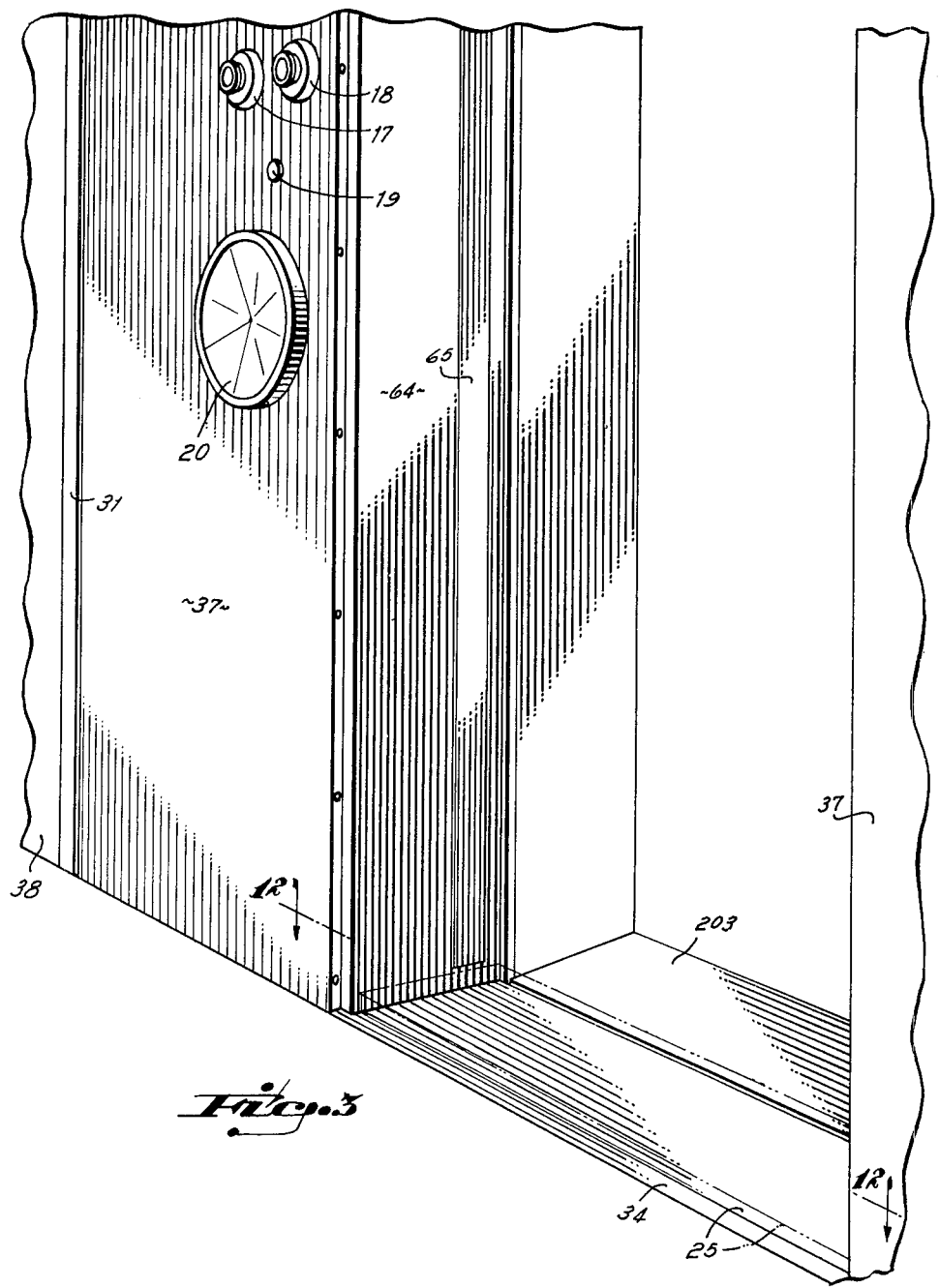

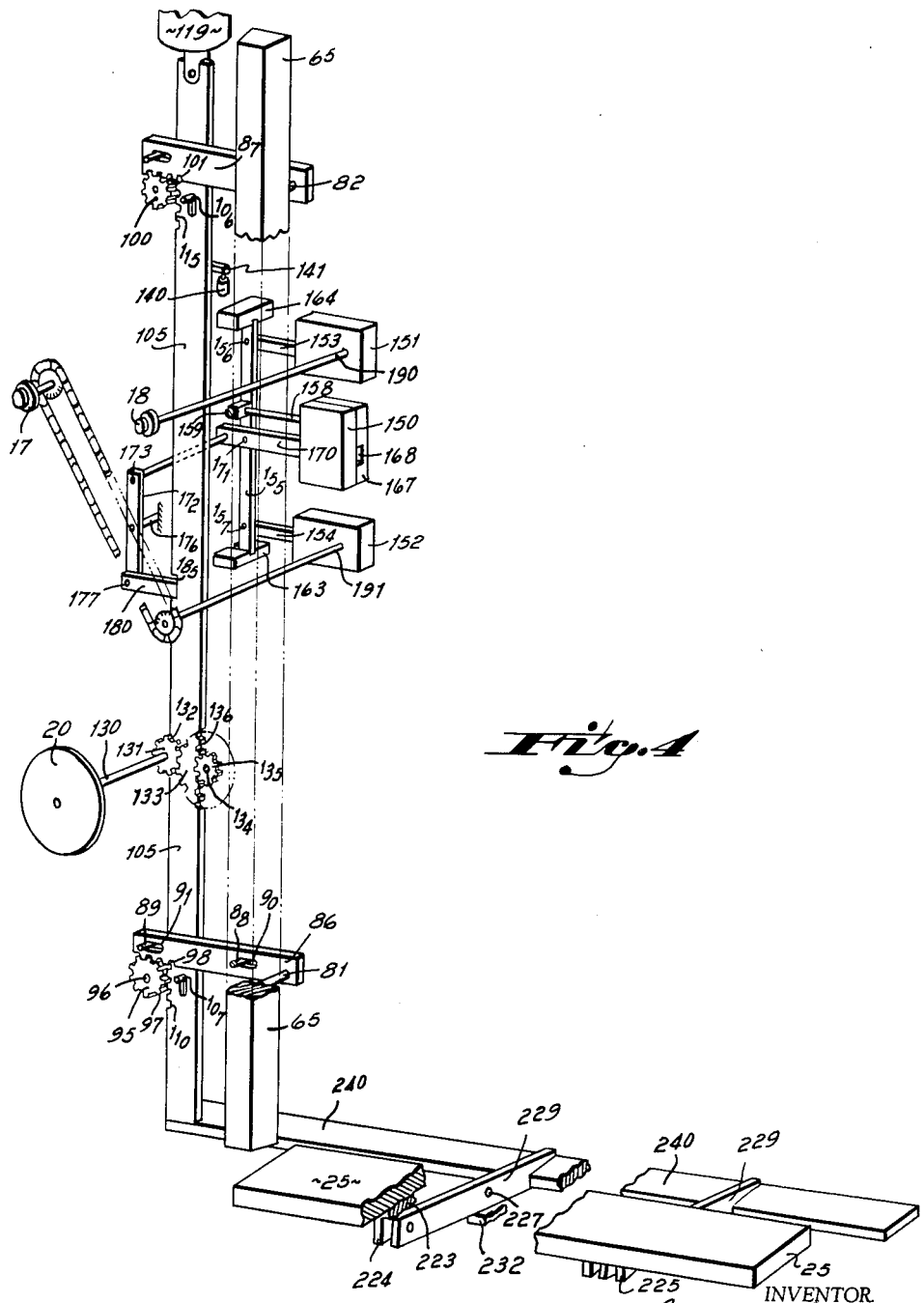

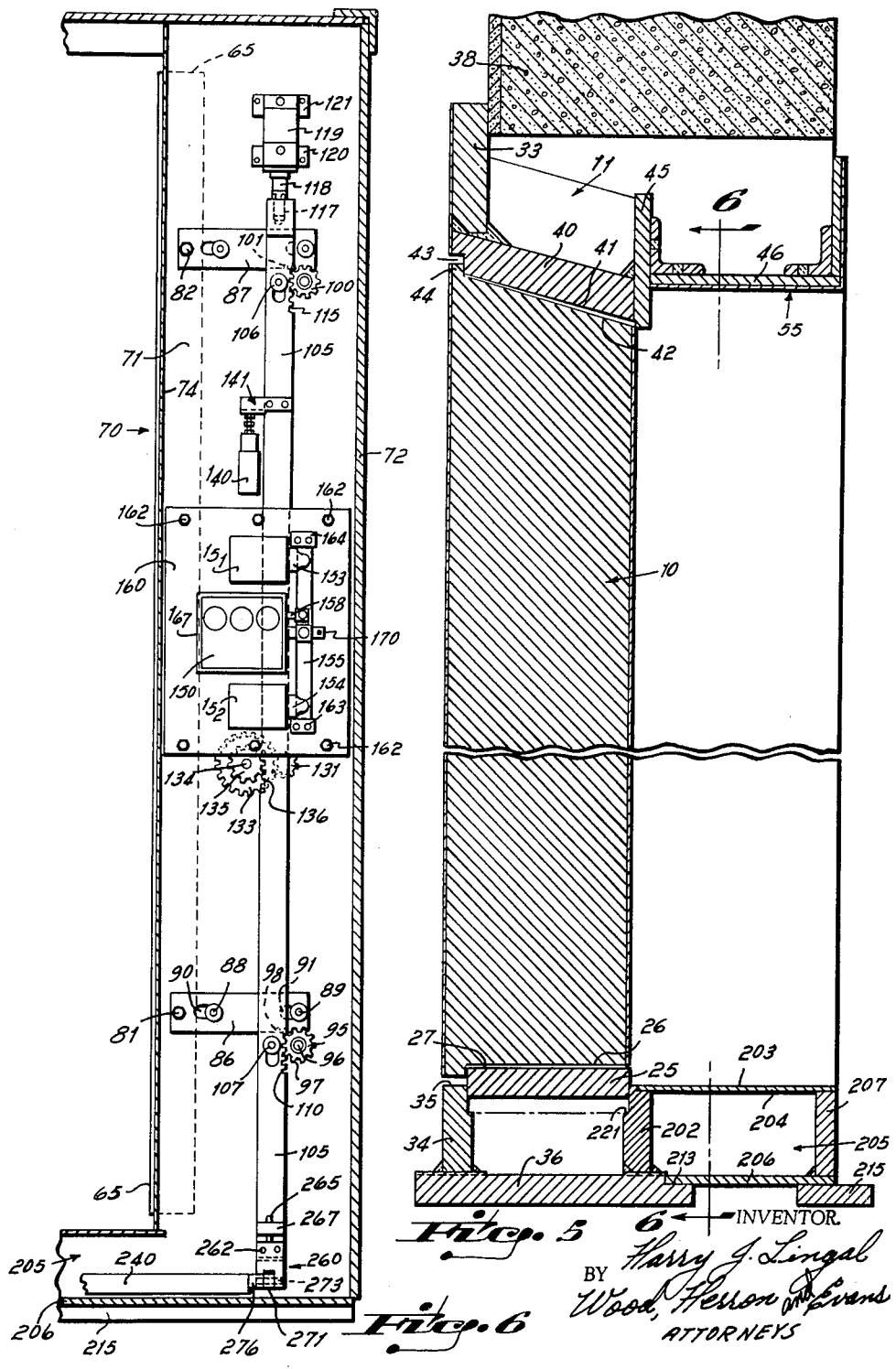

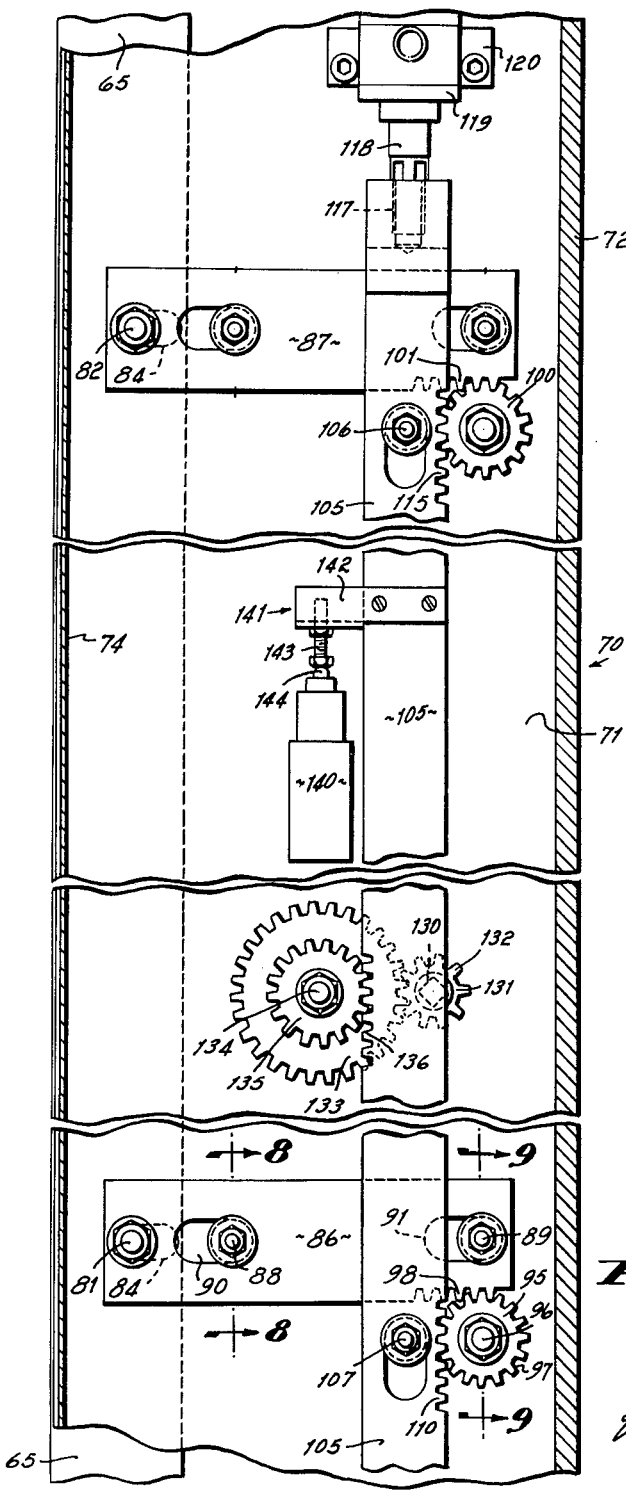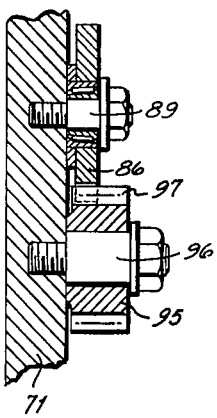

Dec. 14, 1965    H. J. LINGAL    3,223,057
VAULT DOOR

Filed July 26, 1963    10 Sheets-Sheet 8

INVENTOR.
Harry J. Lingal
BY
Wood, Herron & Evans
ATTORNEYS

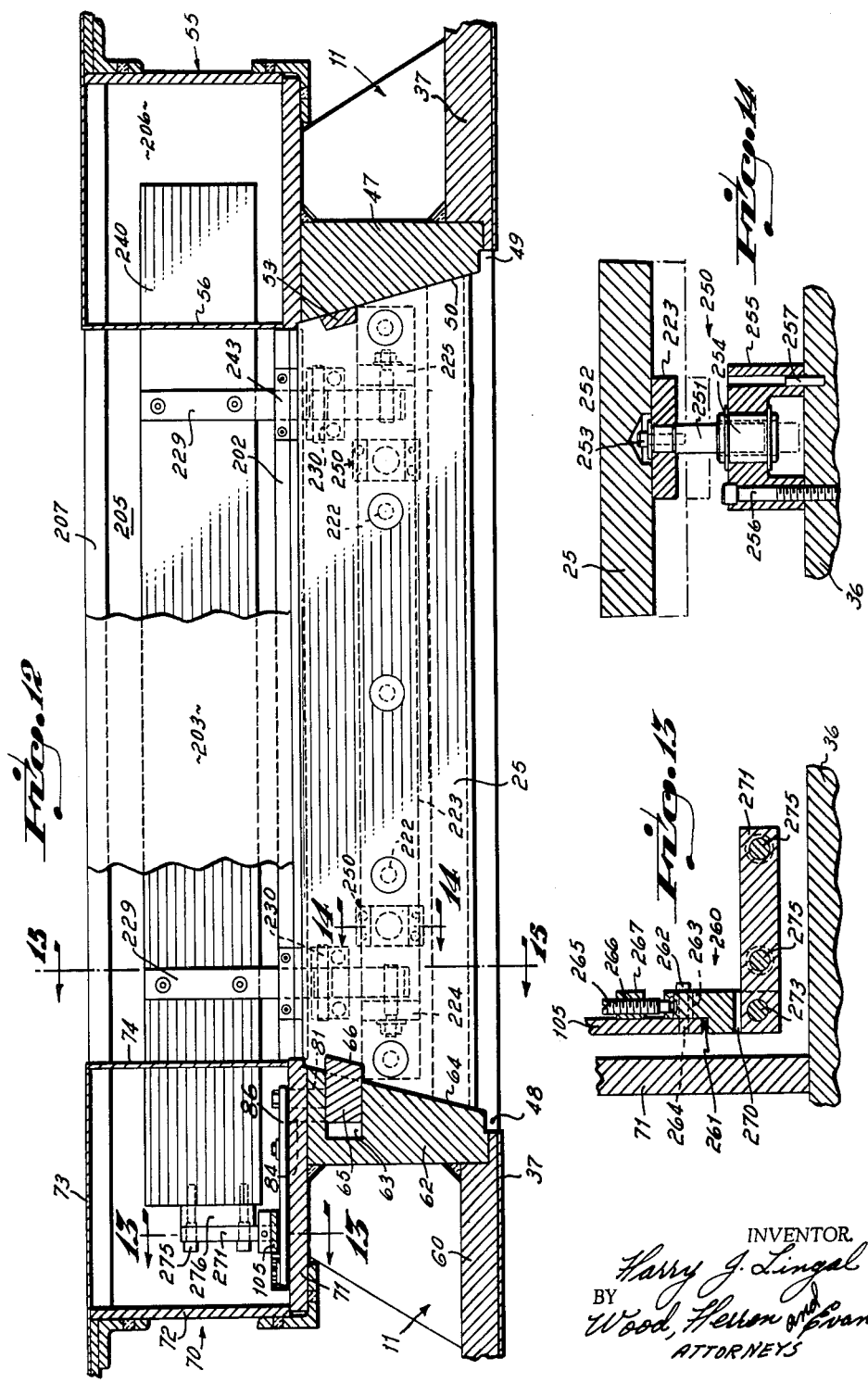

Dec. 14, 1965    H. J. LINGAL    3,223,057
VAULT DOOR
Filed July 26, 1963    10 Sheets-Sheet 10
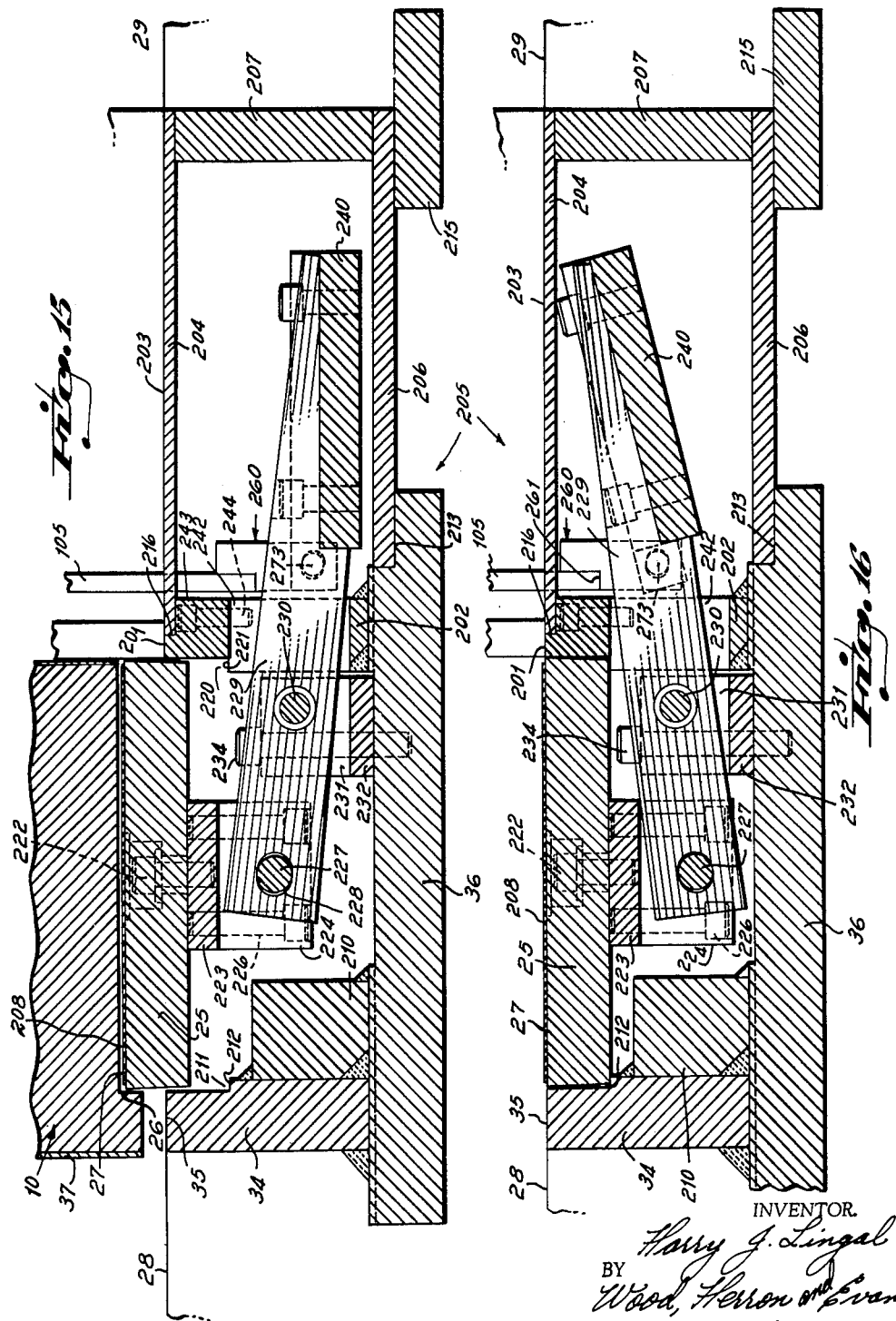
INVENTOR.
Harry J. Lingal
BY
Wood, Herron and Evans
ATTORNEYS

United States Patent Office 3,223,057
Patented Dec. 14, 1965

3,223,057
VAULT DOOR
Harry J. Lingal, Hamilton, Ohio, assignor to The Mosler Safe Company, Hamilton, Ohio, a corporation of New York
Filed July 26, 1963, Ser. No. 297,778
8 Claims. (Cl. 109—59)

This invention relates to safe vaults and more particularly to a vault having a flat floor sill.

Bank vaults have traditionally been equipped with a floor bridge which served as a walkway or ramp between the bank floor and the interior of the vault. The bridge was required to span the bank floor level and the higher vault floor level. Variance between the vault floor level and the bank floor resulted from the clearance gap required between the bottom of the door and the bank floor in order to permit the door to swing open. However, the gap could not extend beneath the door and into the interior of the vault without weakening the vault's explosion resistance. Therefore the interior of the vault has traditionally been ½" to 1½" higher than the bank floor level and the vault door has had a depending lip which abutted against the door sill with the door closed. It precluded explosives or any other device from being inserted beneath the vault door into the interior of the vault.

Generally the floor bridges used to provide a ramp between the two levels have been of two types. The first is a removable plate of sheet steel which extends between the interior of the vault and the interior of the bank. The second and newer variety is a pivotal bridge mounted in the interior of the vault behind the closed door which folds down so as to extend into the bank when the door is opened and automatically folds up into a vertical position when the door is closed. Both types have disadvantages. One is that it renders the movement of heavy teller buses, coin carts or bullion carts into the vault difficult because they must be forced up the ramp or floor bridge. Another is that it is a safety hazard to the bank customers. Oftentimes they are awed by the massiveness of the vault to the point that they are gawking at the surroundings rather than watching their step upon entering the vault. As a consequence a ramp or even a slight step is a hazard.

It has been an objective of this invention to provide a completely flat bank vault entrance with no difference in levels between the interior of the bank and the interior of the vault. This construction has the advantage of eliminating any safety hazard and facilitating the movement of carts, teller's buses, and other objects into and out of the vault.

More specifically it has been an objective of this invention to provide a flat floor sill vault door which has the same degree of security as the conventional varied floor level vault door. To this end this invention incorporates a movable floor sill plate which when the vault door is open has a top surface at the same level as that of the bank and vault floor and when the vault door is closed moves upwardly into a recess in the vault door. When in the upward position the floor sill plate occupies or fills the gap which would otherwise occur between the bottom of the vault door and the floor sill.

Still another objective of this invention has been to provide an automatically actuated movable floor sill plate movable into its upward position or door locked position upon closing of the vault door and automatically lowered to its floor level position upon opening of the door. To this end this invention incorporates two embodiments, one of which is particularly well suited for use with the conventional door having the locking mechanism mounted in the door and the second of which is particularly adapted for use with a door having the locking mechanism mounted in the door jamb.

Figure 11:
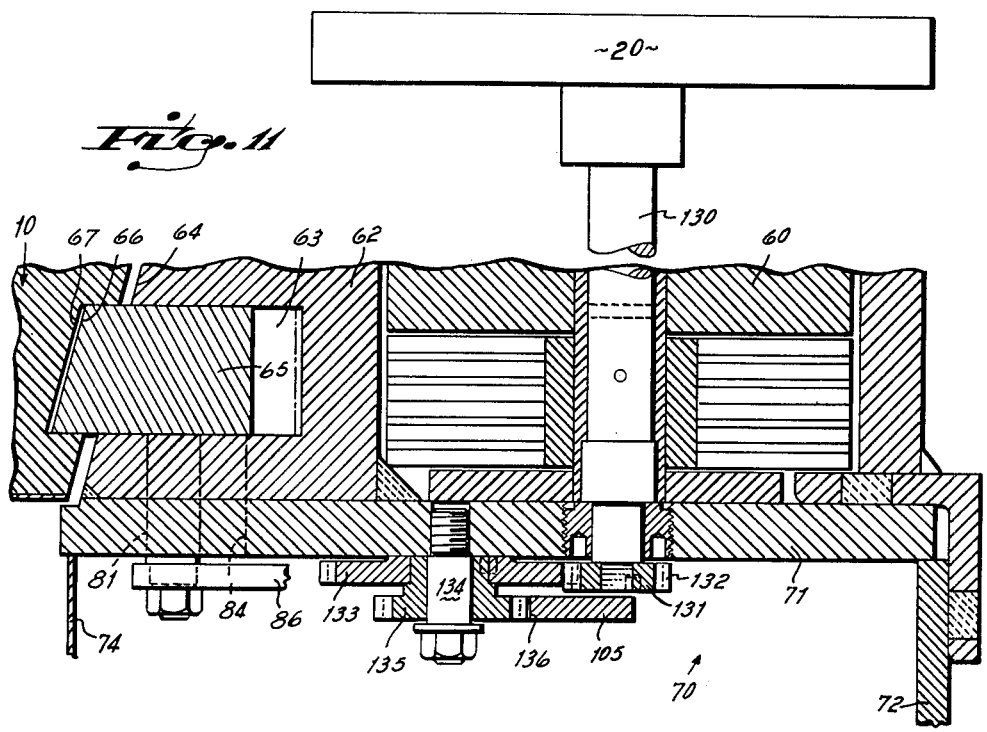
Figure 17:
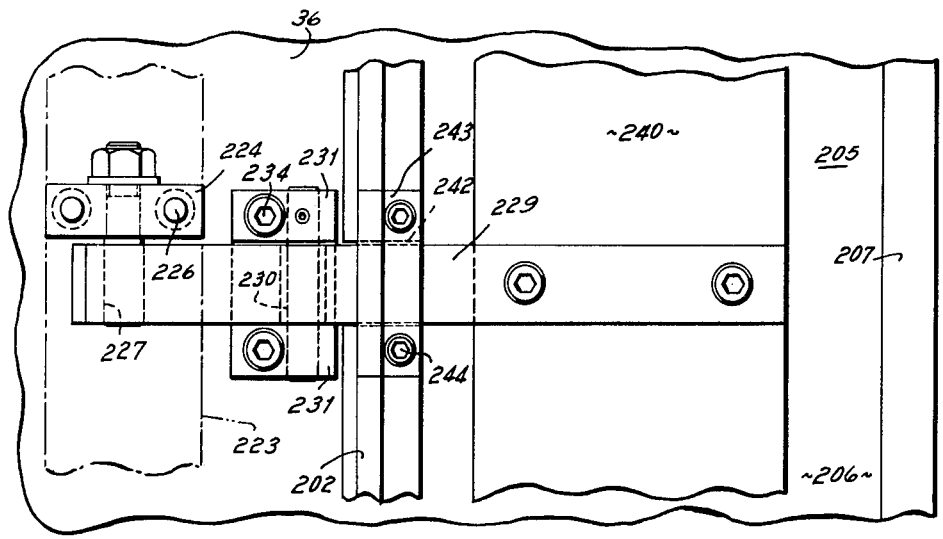

These and other objectives of this invention will be more readily apparent from the following detailed description taken with the accompanying drawings in which:

FIGURE 1 is a front elevational perspective view of the first embodiment of the door assembly with the vault door closed, FIGURE 2 is a view similar to FIGURE 1 but with the vault door open, FIGURE 3 is an enlarged perspective view of the lower portion of the door assembly of FIGURE 1 with the door open, FIGURE 4 is a diagrammatic view of the locking mechanism of the vault door assembly of FIGURE 1, FIGURE 5 is a cross sectional view partially broken away taken along the line 5—5 of FIGURE 1, FIGURE 6 is a cross sectional view taken along the line 6—6 of FIGURE 5, FIGURE 7 is an enlarged cross sectional view partially broken away of a portion of the locking mechanism shown in FIGURE 6, FIGURE 8 is a cross sectional view taken along the line 8—8 of FIGURE 7, FIGURE 9 is a cross sectional view taken along the line 9—9 of FIGURE 7, FIGURE 10 is an enlarged elevational view of a portion of the locking mechanism of FIGURE 6, FIGURE 11 is a cross sectional view taken along the line 11—11 of FIGURE 10, FIGURE 12 is a cross sectional view taken along the line 12—12 of FIGURE 3, FIGURE 13 is a cross sectional view taken along the line 13—13 of FIGURE 12, FIGURE 14 is a cross sectional view taken along the line 14—14 of FIGURE 12, FIGURE 15 is a cross sectional view taken along the line 15—15 of FIGURE 12, showing the flat sill in the raised position, FIGURE 16 is a cross sectional view similar to FIGURE 15 but showing the floor sill in the lowered vault door open position, FIGURE 17 is an enlarged top plan view of a portion of the floor sill mechanism shown in FIGURE 12.

Referring to FIGURES 1 through 17, it will be seen that the vault door 10 is mounted within the door frame 11 for pivotal movement about a pair of hinges 12, 13. In contrast to the more conventional vault door which is mounted upon crane hinges for linear and then pivotal movement, this embodiment of the invention utilizes only pivotal movement of the door to open or close. Additionally, this door differs from the more conventional vault door in that the lock mechanism is all mounted in the door frame rather than as a part of the movable door.

A handle 16 extends from and is attached to the front of the door. A pair of combination lock dials 17, 18, a door opening and closing control switch 19, and a hand wheel 20 extend from the front of the door architrave 37. To open the door, the dials 17 and 18 are rotated to the proper combinations and the door lock bar withdrawn by either pushing the automatic control button 19 which causes the lock bar to be withdrawn and the door to open, or alternatively, if the door is to be opened manually, the hand wheel is rotated to withdraw the lock bar and the door pulled open by means of the handle 16. Thus opening and closing of the vault door of this embodiment may be done either automatically by actuating the button 19 or manually by operating the hand wheel and either pulling or pushing upon the handle 16 depending upon whether the door is to be opened or closed.

A movable floor sill plate 25 is mounted beneath the door when it is closed and extends upwardly into a recess 26 (see FIGURES 5 and 15) in the bottom of the door. It is automatically lowered when the door is opened so that the top surface 27 is at the same level as that of the bank floor 28 and the vault floor 29 when the door is opened.

The mechanism for raising and lowering the sill plate 25 is connected to and controlled by the locking mechanism of the door. This mechanism is all mounted behind the architrave 37 in the door frame.

The frame

The door frame 11 is rectangular in shape. Covering the frame 11 is the architrave 37 which is located on both sides of the door. It is surrounded by architrave trim plates 31, 32, and 33. For purposes of appearance, the trim plates, the architrave and the door are all covered with decorative steel.

Forming a part of the door frame at the floor level is a vertical bar 34 set into the bank floor with its top surface 35 in the horizontal plane of the bank floor. At the bottom, bar 34 is welded to a bed plate 36 which serves to prevent attack of the vault by digging under the door.

The trim plates 31, 32 and 33 overlap the exterior vault wall 38 at their outer edges. The inner edges overlap and are attached to architrave plates 37 which in turn are attached to steel plates extending inwardly into the vault. The inwardly extending plate 40 attached to the upper plate 33 is inclined downwardly and inwardly so as to provide an inclined surface 41 against which an upper inclined surface 42 of the door abuts. At its lower outer edge the plate 40 is recessed as shown at 43 to provide a seat for an upwardly extending lip 44 on the door. The rear surface of the plate 40 is welded to a re-inforcing bracket 45 which is in turn secured to a U-shaped channel 46 which extends across the door between the vertical sections of the frame.

The vertical trim plate 32 on the hinge side of the door is secured to the architrave 37 (see FIGURE 12) upon which are mounted the upper and lower door hinges 12, 13. The inner edge of the architrave 37 is welded to the door jamb 47 which extends between the upper trim plate 33 and lower frame bar 34. The front surface of the door jamb 47 is located in the plane of the front surface of the frame. A section of the frame overlaps approximately one half of the front surface of the jamb member 47 so as to define a recess 49 for the reception of a vertically extending lip on the inside of the door.

The inside surface of the jamb 47 extends inwardly and rearwardly to define an inclined surface 50 against which the hinge side surface 51 of the door abuts. A vertically extending bar 53 is welded to the inner edge surface 50 of the door jamb. This bar in cross section has the shape of an isosceles trapezoid and is received within a groove 54 of the same cross sectional shape when the door is closed. The function of this bar is to prevent opening of the door by removal of the hinges 12, 13 when the door is closed. At the rear the door jamb 47 is welded to a box shaped vestibule frame section 55, the inside edge plate 56 of which defines a portion of the doorway when the vault door 10 is opened.

The other vertical trim plate 31 on the opposite side of the door is secured to the architrave 37 in the same manner that the architrave is secured to side trim plate 32. Similarly, the architrave 37 overlaps a portion of a door jamb member 62 on this side of the door to define a recess 48 for the reception of a lip on the door. This side of the door frame differs from the hinge side in that the door jamb 62 has a large recess 63 in its inner surface 64 rather than a vertically extending bar. Received within the recess 63 is a lock bar 65 which as explained hereinafter is movable from a withdrawn position in which the inside edge 66 is in the plane of the inside surface 64 of the jamb to a position in which the lock bar 65 extends into a door recess 67 when the door is closed and locked. On this side of the door the box shaped vestibule frame section 70 houses a portion of the door locking mechanism. This section consists of a front plate 71 welded to the door jamb 62, a rearwardly extending re-enforcing plate 72, a rear plate 73 which forms a portion of the interior surface of the vault and a side plate 74 which defines the doorway when the vault door is open.

Vault door locking mechanism

Referring to FIGURES 4 and 6–10, it will be seen that the key or heart of the locking mechanism is the lock bar 65 movably mounted in the recess 63 in the door jamb 62. In the withdrawn position its inside surface 66 forms a continuation of the inclined surface 64 of the door jamb and thus defines a portion of the doorway. When extended (see FIGURES 11 and 12), its innermost portion fits within a longitudinal recess 67 of the door where it secures the door in the locked position.

The lock bar 65 is rigidly connected near its bottom to a rearwardly extending pin 81 and near its top to a similar rearwardly extending pin 82. Each of these pins extends through an elongated slot 84 (FIGURE 12) in the plate 71 and door jamb 62. The length of the slot is such that it permits the lock bar 65 to move from a withdrawn position within the door jamb to an extended position in which a portion of the bar extends into the side of the door. This movement is controlled by the pins 81, 82 which are connected to racks 86 and 87 respectively behind the plate 71. Each of these racks is mounted for horizontal movement upon a pair of horizontal spaced pins 88, 89. The pins are rigidly mounted within the re-enforcing plate 71 and extend through elongated slots 90, 91 in the racks.

Movement of the lower rack 86 is controlled by a pinion 95 rotatably mounted upon a stud 96 threaded into and thus rigidly attached to the plate 71. The width of the gear teeth 97 on the pinion 95 is approximately twice the width of the teeth 98 on the rack 86. Thus the teeth of the rack mesh with and engage only the forwardmost half of the gear teeth on pinion 95.

In a similar fashion movement of rack 87 is controlled by a pinion 100 the gear teeth of which mesh with teeth 101 on rack 87. The pinion 100 is identical to the lower pinion 95. Similarly, the rack 87 is identical to the lower rack 86 and the teeth on the two are mounted identically so that the teeth of the rack 87 mesh with only the forwardmost half of the gear teeth of pinion 100. Rotational movement of the pinions 95 and 100 and thus linear movement of the racks 86, 87 is controlled by vertical movement of a rack 105 which extends approximately the full height of the door. Vertical rack 105 is mounted for vertical movement upon a pair of vertically spaced studs 106, 107 which are threaded at their forward end into re-enforcing plate 71. Spacer sleeves (not shown) maintain the rack 105 spaced from the re-enforcing plate 71. Near its lower end rack 105 has gear teeth 110 which mesh with the teeth 97 of pinion 95. Referring to FIGURE 9, it will be seen that the thickness of the rack 105 and thus the thickness of the teeth 110 on the rack is approximately one-half the width of the gear teeth 97 of pinion 95 and mesh with only the rearward half of the pinion teeth. Thus the pinion 95 meshes with both the horizontal rack 86 and the vertical rack 105 and there is no interference between the two racks.

Similarly near its upper end the vertical rack 105 has teeth 115 which mesh with the teeth of pinion 100 so that upon vertical movement of rack 105 the pinion is rotated and the horizontal rack 87 moved linearly.

At its upper end rack 105 has a threaded aperture 117 threaded onto the lower end of a piston rod 118 of reciprocal hydraulic motor 119. The motor 119 is bolted onto the back of re-enforcing plate 71 by a pair of brackets 120, 121.

As should now be obvious, upward movement of piston rod 118 of hydraulic motor 119 causes the vertical rack 105 to be moved upwardly rotating the pinions 95, 100 in the clockwise direction as viewed in FIGURE 7 so as to move the horizontal racks 86, 87 to the right as viewed in this figure. When the racks 86, 87 are moved to the right, lock bar 65 is also moved in this direction and withdrawn from the recess in the door. In this position of the lock bar the door is free to be pulled outwardly or opened about the hinges 12, 13.

Because there is always a possibility of a power failure or a motor breakdown, a manual system for opening the door is provided as well as an automatic system which incorporates the reciprocal hydraulic motor 119. For this reason the hand wheel 20 is provided. It is mounted on the outside of the architrave 37 and rigidly connected to a shaft 130 which extends through the architrave. Connected to this shaft 130 inside the frame is a pinion 131 the teeth 132 of which mesh with a larger spur gear 133. Gear 133 is rigidly mounted upon a shaft 134 which also carries a smaller spur gear 135. The teeth of gear 135 mesh with the teeth 136 of the vertical rack 105 so that upon rotation of the hand wheel, the rack is moved upwardly or downwardly depending upon the direction of rotation of the hand wheel and the lock bar 65 accordingly moved into or out of the door. To control automatic closing of the door a limit switch 140 is attached to the rear of plate 71 in a position to be engaged by an actuating dog 141 connected to the vertical rack 105. The dog consists of a horizontally extending bracket 142 into which is threaded a depending stud 143. When the rack is moved downwardly into a position in which the door is completely locked and the lock bar 65 extends into the recess 67 of the door, the bottom of stud 143 engages the actuator 144 of switch 140 to open a control circuit (not shown).

Locking and unlocking of the door is controlled by a time lock 150 and a pair of combination locks 151, 152. The time lock is a conventional three movement time lock. Two combination locks are used for security purposes. In most large commercial banking installations two persons are used to control opening of the vault door. In this type of installation, each of the combination locks has a different combination and only one person in the bank knows the combination of one of the locks. Thus unless both of the bank personnel who are equipped with the combination of their respective locks are present, the vault door cannot be opened. Alternatively, by altering a pin setting as is explained hereinafter, the locking mechanism may be set so that either one of the combination locks will control opening of the door as opposed to both of the locks. In a small country bank, the lock mechanism might be set up in this latter way.

Referring to FIGURES 6 and 10, it will be seen that the lock bolt 153 of the upper combination lock and the lock bolt 154 of the lower combination 152 are interconnected by a vertical connecting link 155. Each of these lock bolts is pinned to the linkage by a connecting pin 156, 157. The lock dog 158 of the time lock 150 is also pinned to the connecting link 155 at a location between the pins 156, 157 by a connecting pin 159.

The combination locks 151, 152 and the time lock 150 are all mounted upon a supporting plate 160 secured to but spaced from the re-enforcing plate 71. The supporting plate 160 is secured to the re-enforcing plate 71 by a plurality of studs 162 over which are mounted spacer sleeves (not shown) to maintain the spacing between the supporting plate 160 and the re-enforcing plate 71.

Also bolted to the supporting plate 160 are a pair of guideway brackets 163, 164 which support the lower and upper ends of the connecting link 155 and permit it to slide horizontally. The guideways in each of the brackets 163, 164 are defined by slots 165, 166 in the upper and lower edges of the brackets 163, 164 respectively.

Secured between the time lock 150 and the supporting plate 160 is a guideway plate 167 in the front surface of which is a groove 168 defining a slideway for a movable bar 170. The bar 170 is connected to the vertical link 155 by a pivot pin 171. It extends beyond the pin with its free end being pivotally secured to a pivot link 172 by a pivot pin 173 which extends through a longitudinal slot 174 in the bar 170. Pivot link 172 is mounted near its center for pivotal movement upon a stud 176 and has its other end pivotally mounted upon a pin 177 which extends into a slot 178 in a lock dog 180. The lock dog is slidable in a guideway 181 defined between the mounting plate 160 and a bracket 182 attached to the front of the plate 160. The free end of the lock dog 180 extends into a slot 185 in the vertical rack 105 so as to preclude vertical movement of the rack and thus opening of the door until the lock dog 180 is withdrawn from the recess 185 in the rack. Withdrawal of the lock dog 180 occurs as a result of movement to the left as viewed in FIGURE 10 of the bar 170 causing the pivot link 172 to rotate about the pivot shaft 176 and thus move the lock dog to the right as viewed in this figure withdrawing it from the slot 185 in the rack 105.

While the combination locks 151, 152 are mounted in vertical spaced relationship in order to conserve space within the door jamb, the dials which control these combination locks are mounted in horizontally spaced relationship. For this reason the dial 18 of combination lock 151 is mounted directly upon the shaft 190 of the lock 151, while the dial 17 which controls the combination lock 152 is connected to the shaft 191 of lock 152 by a chain and sprocket drive as shown in phantom in FIGURE 10. As should now be obvious, to open the door, the combination is dialed into the combination lock 151 by turning the dial 18 so as to cause the lock bolt 153 to be moved to the left as viewed in FIGURE 10. Assuming that the time lock has been thrown and the block (not shown) dropped out of the path of the lock dog 158 so as to permit the lock dog to move to the left as viewed in this figure, the connecting link 155 will be moved to the left about the pivot pin 157. Movement of the vertical link 155 about the pivot pin 157 causes the bar 170 to be moved to the left as a result of the interconnection of the vertical link 155 and the bar 170. However, this movement is not sufficient to withdraw the lock dog 180 from the recess 185. The combination of the other lock is then dialed into the dial 17 causing the lock bolt 154 of combination lock 152 to be moved to the lift as viewed in FIGURE 10. This movement also causes the bar 170 to be moved further to the left moving with it the pivot pin 173 and the attached upper end of the connecting link 172 which pivots about the shaft 176 causing the lower end of the connecting link to be moved further to the right withdrawing the lock dog 180 completely from the recess 185 of the rack 105. Of course, it makes absolutely no difference which combination lock is actuated first. Additionally, the pin 173 can be located in another slot (not shown) in the bar 170 so that actuation of either combination lock will cause sufficient movement of the linkage 185 to withdraw the lock dog 180 from the recess 185 in the rack and thus permit vertical movement of the rack. However, in most installations the pin 173 is so located in the bar 170 that both combination locks must be opened in order to cause sufficient horizontal movement of the bar 170 to withdraw the lock dog 180 from the recess 185 of the rack. It should also be noted that if the time lock has not run down, the lock dog 158 will be unable to move into the time lock and no amount of turning or twisting of the dials will cause the lock mechanism to be operated so as to withdraw the lock dog from the rack. With the lock dog 180 withdrawn from the rack, it is free to be moved either manually by the hand wheel 20 or automatically upon actuation of the push button 19 by the reciprocal hydraulic motor 119.

Floor sill mechanism

In order to provide a flat walking surface between the inside of the bank and the interior of the vault while still retaining some means for closing the gap between the bottom of the vault door and the floor sill, a portion of the door floor sill is movable into the two positions shown in FIGURES 15 and 16. To this end, the floor sill plate 25 is movable into the recess 26 of the door when it is closed. Upon opening of the door the sill automatically retreats into a position in which its upper surface 27 is located in the horizontal plane of the interior of the bank floor 28 and the interior of the vault 29.

When the door is open, the door sill surface is defined by the top surface 35 of the plate 34, the top surface 27 of the floor sill plate 25, a top surface 201 of a mounting plate 202 and a top surface 203 of a floor plate 204. The top surface of all of these members extends across the complete width of the doorway. If desired, a thin rubber floor mat 208 may be provided over the top of the floor sill plate 25.

The mechanism for automatically moving the floor sill plate 25 upwardly into the door when it is closed and for lowering it to floor level when the door is open is contained within a housing 205 recessed in the bank floor below the door. The housing is defined by a vertical plate 34, a horizontal base plate 36, a horizontal plate 206, a vertical plate 207 and the floor plate 204. This housing structure thus defines a generally rectangular cavity within which is mounted the floor sill mechanism.

The vertical plate 34 is welded to the base plate 36 with a re-enforcing block 210 welded in the inside corner between these two members to give added attack resistance to the floor structure. A floor sill seating notch 211 is machined out of the upper inside edge of the vertical plate 34 so as to provide a horizontal seating surface 212 for the bottom of the sill plate 25 when it is in the lowered or door open position.

The upper inside edge of the base plate 36 is also notched so as to provide a seating surface 213 for the leading edge of the plate 206. The inside end of the plate 206 rests upon a floor plate 215 to which the plate 206 is welded. Welded to the top surface of the plate 206 is the vertical plate 207 on the top surface of which is mounted the inside edge portion of the floor plate 204. The forward edge of the floor plate 204 is seated within a recess 216 in the top surface of the vertical plate 202 which is welded at its bottom to the base plate 36.

With the door open the sill plate 25 extends between the notch 211 in the vertical plate 34 and a similar sill plate seating notch 220 along the upper forward edge of the vertical plate 202. Secured to the bottom of the sill plate 25 by a plurality of mounting studs 222 is a plate 223 which extends substantially the full width of the doorway. A pair of spaced depending supporting plates 224, 225 are bolted to the bottom plate 223 by a pair of bolts 226. The depending plates 224, 225 each serve as a mounting bracket for a horizontal pivot shaft 227. The end of each shaft 227 extends beyond the mounting plate 225 into the elongated aperture 228 in one end of a rocker arm 229.

Each rocker arm 229 is pivotally mounted near its center upon a rocker shaft 230. The ends of each rocker shaft 230 are journalled within upstanding legs 231 of a U-shaped mounting bracket 232 the web 233 of which rests upon the base plate 36 and is secured thereto by a pair of bolts 234. Thus the rocker arms 229 are free for limited rotational movement about the rocker shafts 230. When the rocker arms 229 are rotated in the counterclockwise direction as viewed in FIGURE 15 the floor sill is lowered and when rotated in the clockwise direction the floor sill is raised.

To minimize the energy input necessary to raise and lower the floor sill, a large counterweight 240 is bolted to the bottom of the rocker arms at the end opposite the pivot shafts 227. Referring to FIGURE 12, it will be seen that the counterweight is of greater width than the door. Its weight is such that it provides a greater turning moment about the rocker shaft 230 than does the floor sill so that the sill is always biased into the upward position. Thus in the event of a failure of the floor sill actuating mechanism the sill plate 25 will always be retained in the upward position in which it is located in the recess 26 at the bottom of the door.

Since the vertical plate 202 is located between the ends of the rocker arms 229, vertical channels or recesses 242 are provided in the plate through which the rocker arms extend. These channels are covered by a cover plate 243 secured to the top of the vertical plate 242 by a pair of bolts 244.

Referring to FIGURES 12 and 14, it will be seen that the floor sill plate 25 is guided during vertical movement by a pair of guide assemblies 250 located adjacent the sides of the door sill. Each of these assemblies consists of a depending guide rod 251 secured to the bottom plate 223 by a washer 252 and bolt 253. Each of the rods 251 extends through a bushing 254 mounted within an inverted U-shaped bracket 225 secured to the base plate 36 by a pair of bolts 256 and locating pins 257.

Actuation of the sill plate is controlled by movement of the vertical rack 105. Referring to FIGURES 6, 13, and 15, it will be seen that the bottom of rack 105 extends beneath the vault floor level and has a vertically adjustable mount 260 secured to its lower end. The mount 260 is notched as indicated at 261 to provide a seat for the lower end of the rack 105. It is secured to the rack by a pair of bolts 262 which extend through the vertical slots 263 in the mount and into threaded apertures 264 in the rack. Vertical adjustment of the mount 260 relative to the rack is controlled by a screw 265, which extends through a threaded vertical aperture 266 in a mounting block 267 attached to the rack. The lower end of the screw is rotatably connected to the mount 260 so that upon rotation of the screw the mount is moved vertically relative to the rack.

The lower end of the mount 260 has a vertical recess 270 machined therein so that the bottom defines a bifurcated lower end. One end of a mounting bar 271 extends into this recess and is secured therein by a pivot pin 273 journalled in the bracket and extending across the recess. The bar 271 is secured to the counterweight 240 by a pair of bolts 275. A filler block 276 is mounted between the end of the counterweight and the bar 271. The pin 273 thus accommodates vertical arcuate movement of the counterweight when the rack is moved vertically.

As should now be obvious, to open the door the combination locks are both actuated and assuming the time lock to be actuated, the lock dog 180 is withdrawn from the rack so that it is free to move vertically upon automatic actuation of the rack or manual operation. Vertical movement of the rack causes withdrawal of the lock bar from the door recess permitting it to open and also move the floor sill downwardly into a position in which its top surface is in the horizontal plant of the bank floor and vault floor. When the door is locked, the rack is moved downwardly causing the lock bar to be moved into the door and the floor sill to be raised into a position in which it bridges the gap between the bottom of the door and the floor sill.

Having described my invention, I claim:
1. A walk-in vault comprising,
   a door frame,
   a vault having a floor located behind said frame,
   a pair of hinges mounted on one side of said frame,
   a door mounted upon said hinges,
   said door having a bottom recess therein,
   a movable floor sill plate mounted beneath said door,
   said plate having a top surface located in substantially the same horizontal plane when the door is open as that of the vault floor, and means operable in response to locking of said door to move a portion of said sill plate upwardly into said door recess.

2. A walk-in vault comprising, a door frame, a vault having a floor located behind said frame, a pair of hinges mounted on one side of said frame, a door mounted upon said hinges, said door having a bottom recess therein, a movable floor sill plate mounted beneath said door, said plate having a top surface located in substantially the same horizontal plane when the door is open as that of the vault floor and the floor of the building within which the vault is adapted to be installed, and means operable in response to locking of said door to move a portion of said sill plate upwardly into said door recess.

3. A walk-in vault comprising, a metal door frame, a vault having a floor located behind said frame, a pair of hinges mounted on one side of said frame, a metal door mounted upon said hinges, locking mechanism operatively associated with said door, said door having a bottom recess therein, a movable metal floor sill plate mounted beneath said door, said plate having a top surface located in substantially the same horizontal plane when the door is open as that of the vault floor, a floor sill plate actuating arm mounted beneath said sill plate and connected at one end to the bottom of said plate, and means operatively connected to said arm and to said locking mechanism operable to move a portion of said sill plate upwardly into said door recess upon locking of said door.

4. A walk-in vault comprising, a metal door frame, a vault having a floor located behind said frame, a pair of hinges mounted on one side of said frame, a metal door mounted upon said hinges, locking mechanism operatively associated with said door, said door having a bottom recess therein, a movable metal floor sill plate mounted beneath said door, said plate having a top surface located in substantially the same horizontal plane when the door is open as that of the vault floor, a pivotally mounted floor sill plate actuating arm mounted beneath said sill plate and connected at one end to the bottom of said plate, a counterbalance weight mounted on the opposite end of said arm, and means operatively connected to said locking mechanism operable to move a portion of said sill plate upwardly into said door recess upon locking of said door, 5. A walk-in vault comprising, a metal door frame, a vault having a floor located behind said frame, a pair of hinges mounted on one side of said frame, a metal door mounted upon said hinges, locking mechanism operatively associated with said door, said mechanism including a laterally movable lock bar mounted in said frame movable into a recess of said door to lock the door, a vertically movable member mounted in said frame operable to control lateral movement of said lock bar, said locking mechanism including a time lock and at least one combination lock operable in one position to prevent movement of said vertical member and in another position to permit movement of said vertical member, said door having a bottom recess therein, a movable metal floor sill plate mounted beneath said door, said plate having a top surface located in substantially the same horizontal plane when the door is open as that of the vault floor, and a floor sill plate actuating linkage mounted beneath said sill plate connected at one end to the bottom of said plate and at the opposite end to said vertically movable member whereby locking movement of said member is operable to move a portion of said sill plate upwardly into said door recess.

6. A walk-in vault comprising, a metal door frame, a vault having a floor located behind said frame, a pair of hinges mounted on one side of said frame, a metal door mounted upon said hinges, locking mechanism operatively associated with said door, said mechanism including a laterally movable lock bar mounted in said frame movable into a recess of said door to lock the door, a vertically movable rack mounted in said frame and connected by a rack and pinion linkage so as to control lateral movement of said lock bar, said locking mechanism including a time lock and at least one combination lock operable in one position to prevent movement of said vertical rack and in another position to permit movement of said vertical rack, said door having a bottom recess therein, a movable metal floor sill plate mounted beneath said door, said plate having a top surface located in substantially the same horizontal plane when the door is open as that of the vault floor, and a floor sill plate actuating linkage mounted beneath said sill plate connected at one end to the bottom of said plate and at the opposite end to said vertically movable rack whereby locking movement of said rack is operable to move a portion of said sill plate upwardly into said door recess.

7. A walk-in vault comprising, a door frame, a vault having a floor located behind said frame, a pair of hinges mounted on one side of said frame, a door mounted upon said hinges, said door having a bottom recess therein, a movable floor sill plate mounted beneath said door, said plate having a top surface located in substantially the same horizontal plane when the door is open as that of the vault floor and the floor of the building within which the vault is adapted to be installed, a door locking mechanism for locking said door in a closed condition in said door frame, a manually operable member mounted upon the exterior of said vault for actuating said door locking mechanism, and a linkage interconnecting said manually operable member and said sill plate and operable to move a portion of said sill plate upwardly into said door recess upon actuation of said manually operable member.

8. A walk-in vault comprising, a door frame, a vault having a floor located behind said frame, a pair of hinges mounted on one side of said frame, a door mounted upon said hinges, said door having a bottom recess therein, a movable floor sill plate mounted beneath said door, said plate having a top surface located in substantially the same horizontal plane when the door is open as that of the vault floor and the floor of the building within which the vault is adapted to be installed, a door locking mechanism for locking said door in a closed condition in said door frame, a manually operable member mounted upon the exterior of said vault for actuating said door locking mechanism, and a linkage interconnecting said sill plate and said manually operable member, said linkage including a vertically movable member and a cooperating member engaged by said vertically movable member, said cooperating member being interconnected to said sill plate and mounted for pivotal movement, said vertically movable member being interconnected to said manually operable member and being shifted downwardly upon operation of said manually operable member, downward movement of said vertically movable member being effective to raise a portion of said sill plate into said door recess.

References Cited by the Examiner

UNITED STATES PATENTS

| | | | |
|---|---|---|---|
| 1,234,022 | 7/1917 | Heller | 109—87 |
| 1,369,960 | 3/1921 | Brintnall | 109—87 |
| 1,913,716 | 6/1933 | Meilink et al. | |
| 2,171,921 | 9/1939 | Duval et al. | 109—87 X |
| 2,541,421 | 2/1951 | Hunter | 20—68 |
| 2,732,815 | 1/1956 | Paca et al. | 109—74 X |
| 2,814,262 | 11/1957 | Domenico | 109—87 |
| 2,860,584 | 11/1958 | Deaton et al. | 109—59 |

FOREIGN PATENTS 18,607    12/1890    Great Britain.

HARRISON R. MOSELEY, *Primary Examiner.*

REINALDO P. MACHADO, *Examiner.*